United States Patent
Zhang et al.

(10) Patent No.: US 9,508,041 B2
(45) Date of Patent: Nov. 29, 2016

(54) METHOD FOR PREDICTING USER OPERATION AND MOBILE TERMINAL

(75) Inventors: Qi Zhang, Shenzhen (CN); Ke Mao, Shenzhen (CN); Xiaomei Wang, Shenzhen (CN)

(73) Assignee: ZTE CORPORATION (CN)

( * ) Notice: Subject to any disclaimer, the term of this patent is extended or adjusted under 35 U.S.C. 154(b) by 118 days.

(21) Appl. No.: 13/991,942

(22) PCT Filed: Sep. 20, 2011

(86) PCT No.: PCT/CN2011/079869
§ 371 (c)(1),
(2), (4) Date: Jun. 6, 2013

(87) PCT Pub. No.: WO2012/151831
PCT Pub. Date: Nov. 15, 2012

(65) Prior Publication Data
US 2014/0129501 A1    May 8, 2014

(30) Foreign Application Priority Data
Jul. 18, 2011    (CN) .......................... 2011 1 0200350

(51) Int. Cl.
*G06N 5/02* (2006.01)
*F03G 7/04* (2006.01)

(52) U.S. Cl.
CPC ................. *G06N 5/025* (2013.01); *F03G 7/04* (2013.01); *Y02E 10/10* (2013.01)

(58) Field of Classification Search
CPC .......... G06N 5/025; F03G 7/04; Y02E 10/10
See application file for complete search history.

(56) References Cited

U.S. PATENT DOCUMENTS

| | | | | |
|---|---|---|---|---|
| 6,067,535 | A | * | 5/2000 | Hobson et al. .................. 706/10 |
| 6,601,048 | B1 | * | 7/2003 | Gavan ..................... H04J 3/175 |
| | | | | 379/111 |
| 2005/0071379 | A1 | * | 3/2005 | Kekre ................... G06F 3/0605 |
| 2005/0118996 | A1 | | 6/2005 | Lee et al. |
| 2006/0247915 | A1 | | 11/2006 | Bradford et al. |
| 2010/0145902 | A1 | * | 6/2010 | Boyan ................ G06F 17/3089 |
| | | | | 706/54 |

(Continued)

FOREIGN PATENT DOCUMENTS

| CN | 1497434 | 5/2004 |
|---|---|---|
| CN | 102037481 | 4/2011 |

OTHER PUBLICATIONS

Machine Learning, Wikipedia, retrieved from the Internet Oct. 28, 2015.*
International Search Report for International Patent Application No. PCT/CN2011/079869, mailed Apr. 19, 2012.

(Continued)

*Primary Examiner* — Stanley K Hill
*Assistant Examiner* — Thomas Fink
(74) *Attorney, Agent, or Firm* — McAndrews, Held & Malloy, Ltd.

(57) ABSTRACT

The disclosure discloses a method for predicting a user operation. The method includes the following steps. After training an operation model successfully, a mobile terminal predicts a call instruction by utilizing environmental factors and the operation model, and finally compiles the call instruction into selection information to be displayed to a user. The disclosure further discloses a mobile terminal. Through the solution provided by the disclosure, a forthcoming operation of the user can be predicted, so that intelligent and detailed services are provided for the user.

11 Claims, 4 Drawing Sheets

(56) References Cited

U.S. PATENT DOCUMENTS

2011/0072492 A1* 3/2011 Mohler et al. .................. 726/3
2012/0022700 A1* 1/2012 Drees ..................... G05B 15/02
                                                    700/276

OTHER PUBLICATIONS

Communication and Supplementary European Search Report corresponding to European Application No. EP 11 86 5183, Jan. 21, 2014, 6 pages.

* cited by examiner

METHOD FOR PREDICTING USER OPERATION AND MOBILE TERMINAL

FIELD OF THE INVENTION

The disclosure relates to the smart mobile phone technology in mobile communication, and in particular to a method and a mobile terminal for predicting a user operation.

BACKGROUND OF THE INVENTION

Mobile terminals, such as mobile phones have become life necessities which are carried around. When using a mobile phone, every people may be influenced unconsciously to develop a habit which may be described as follows: an operation may be performed habitually by a user for the mobile phone sometime, somewhere and in a certain environment every day. In other words, the mobile phone is used by the user at some particular moments and particular location in a day according to a certain regular manner. However, in the traditional art, mobile phones cannot memorize operation habits of the user, thus failing to predict a forthcoming operation of the user.

Currently, some mobile phones are simply improved to solve the problem, e.g. a memory program is added to memorize a previous operation of the user, or an icon of an application is set on a main interface so that the application may be used by the user more rapidly. However, the improvement method above can only provide a record of the previous operation of the user, but fails to predict the forthcoming operation of the user. Or, the improvement method above needs the user to operate manually to set applications which are used frequently, and intelligent services cannot be provided to the user. It can be seen that there are no mobile terminals which can predict the forthcoming operation of the user to provide intelligent and detailed services for the user currently.

SUMMARY OF THE INVENTION

In view of this, the disclosure provides a method for predicting a user operation and a mobile terminal, which can predict a forthcoming operation of the user and provide intelligent and detailed services.

The disclosure provides the following technical solution.

The disclosure provides a method for predicting a user operation, the method includes:

after training an operation model successfully, a mobile terminal obtaining a call instruction by utilizing acquired environmental factors and the operation model, and finally converting the call instruction into selection information to be displayed to a user.

In the solution above, training the operation model is embodied as rectifying the operation model by an operation record list.

In the solution above, rectifying the operation model by the operation record list includes the mobile terminal calling operation records in the operation record list one by one, using the environment factors of the operation records as input information of the operation model, comparing output information of the operation model with the call instruction in the operation record, if the output information and the call instruction are identical, continuing to call a next operation record to perform comparison, and if the output information and the call instruction are different, adding 1 to an error of the operation model and rectifying the operation model, and then calling the next operation record to perform comparison until all operation records in the operation record list are called.

In the solution above, training the operation model successfully is embodied as counting the error of the operation model, determining whether or not the error of the operation model is lower than a use threshold which is preset, if the error is lower than the use threshold, the training of the operation model is successful, and otherwise, the training of the operation model fails and training the operation model over again.

In the solution above, before training the operation model by the mobile terminal, the method further includes: the mobile terminal storing the call instruction and performing counting, when a counting value of the call instruction is higher than a record threshold which is preset, compiling the call instruction and the environmental factors as an operation record and storing the operation record in the operation record list.

In the solution above, converting the call instruction into the selection information to be displayed to the user includes: compiling a to-be-completed operation in the call instruction into a piece of selection information which needs the user to select whether or not to execute.

The disclosure further provides a mobile terminal, the mobile terminal includes:

an operation model module, configured to input environmental factors into an operation model after the operation model is trained successfully, and send a call instruction to an output module, wherein the call instruction is calculated and outputted by the operation model;

an output module, configured to receive the call instruction sent by the operation model module, convert the call instruction into selection information, and send the selection information to a display interaction module; and the display interaction module, configured to receive the selection information sent by the output module and display the selection information to a user.

In the solution above, the mobile terminal further includes:

an input factor acquisition module, configured to receive an environmental factor acquisition instruction sent by the display interaction module and send environmental factor information to the operation model module;

correspondingly, the operation model module is further configured to receive the environmental factor information sent by the input factor acquisition module; and the display interaction module is further configured to send the environmental factor acquisition instruction to the input factor acquisition module when it is detected that the terminal is used by the user.

In the solution above, the mobile terminal further includes an output event abstraction module and a storage module, wherein the output event abstraction module is configured to determine whether or not a counting value of the call instruction exceeds a record threshold, and if the counting value exceeds the record threshold, send the call instruction to the storage module, otherwise, perform no operation; and the storage module is configured to receive the call instruction sent by the output event abstraction module.

In the solution above, the mobile terminal further includes an operation system application module, configured to send the call instruction to the output event abstraction module; and correspondingly, the output event abstraction module is further configured to store the call instruction sent by the operation system application module.

In the solution above, the storage module is further configured to obtain the environmental factor information from the input factor acquisition module when receiving the call instruction, compile the call instruction and the environmental factors as an operation record, and fill the operation record in the operation record list;

correspondingly, the input factor acquisition module is further configured to provide the environmental factor information to the storage module.

In the solution above, the operation model module is specifically configured to call operation records in the operation record list one by one, use the environment factors of the operation records as input information of the operation model, compare output information of the operation model with the call instruction in the operation record, if the output information and the call instruction are identical, continue to call a next operation record to perform comparison, and if the output information and the call instruction are different, add 1 to an error of the operation model and rectify the operation model, and then call the next operation record until all operation records in the operation record list are called.

In the solution above, the operation model module is further configured to determine whether or not the error of the operation model is lower than a use threshold which is preset, if the error is lower than the use threshold, the training of the operation model is successful, and otherwise, the operation model is trained over again.

The method and the mobile terminal for predicting the user operation in the disclosure have the following advantages and characteristics. After the operation model is trained successfully, when the user is about to use the mobile terminal, the mobile terminal will display a predicted forthcoming operation of the user by utilizing environmental factors and the operation model. The user only needs to simply perform selection to complete a series of identical operations which are repeated every day and does not need to perform a great amount of repeated operations every day, thus providing more intelligent and detailed services for the user.

DETAILED DESCRIPTION OF THE EMBODIMENTS

The solution of the disclosure is that after training an operation model successfully, a mobile terminal obtains a call instruction by utilizing environmental factors and the operation model, and finally compiles the call instruction into selection information to be displayed to a user.

In the above, said training refers to rectifying the operation model by an operation record list stored in the mobile terminal.

The operation model is a mathematical model preset in the mobile terminal. The inputs of the operation model are the environmental factors and the output of the operation model is the call instruction. The operation model may be established by utilizing the technology in a neural network.

The environmental factors include a date, a time, a location and a temperature etc.

Drawings are used to explain the disclosure together with embodiments of the disclosure.

Figure 1:
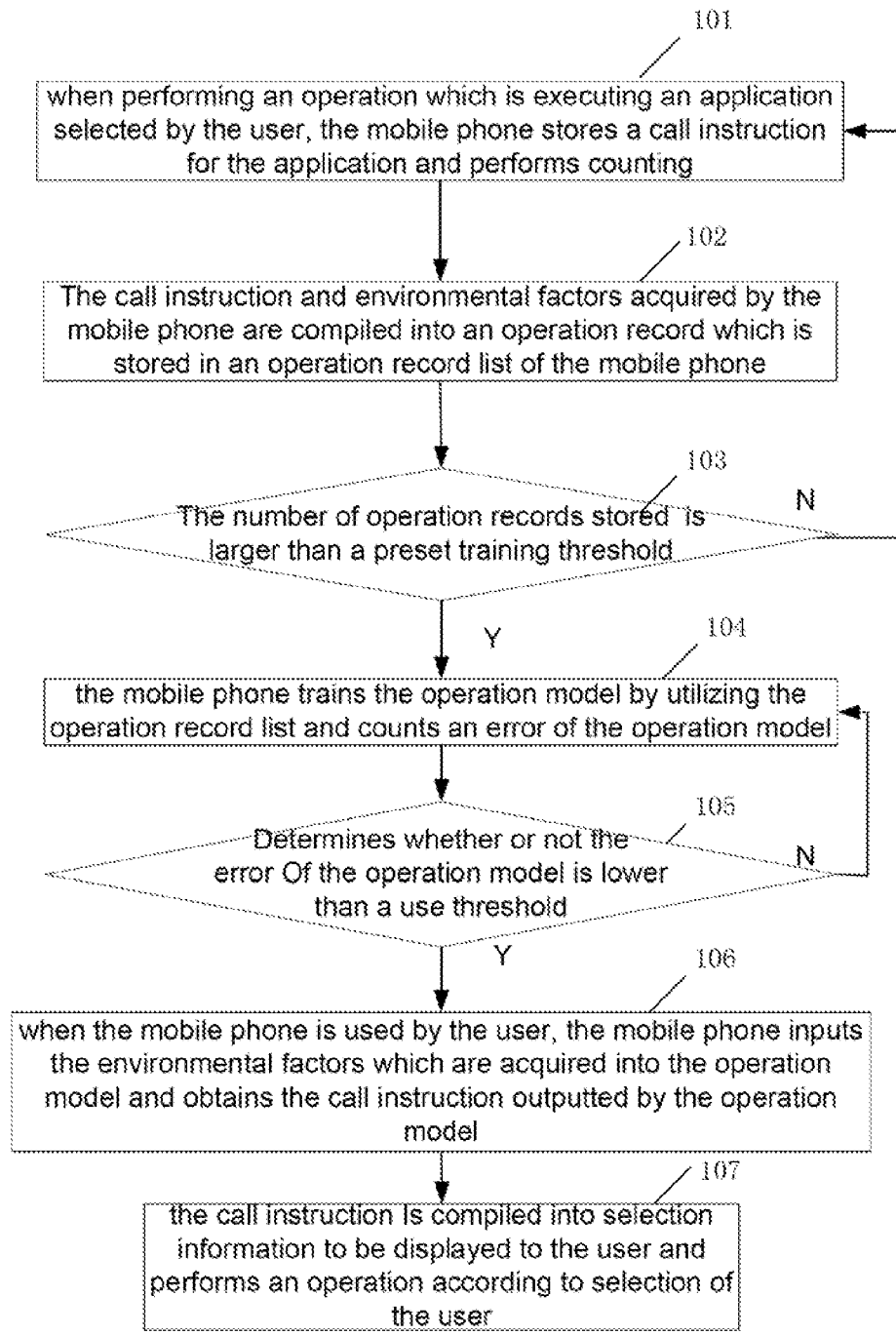
FIG. 1 is a flowchart of a method for predicting a user operation according to the disclosure.

Taking a mobile phone for example, a method for predicting a user operation according to the disclosure is as shown in FIG. 1 and includes the following steps.

Step 101, when performing an operation which is executing an application selected by the user, the mobile phone stores a call instruction for the application and performs counting.

Here, the call instruction is an instruction for calling the application, which is sent when the user uses one of the applications of the mobile phone, and specifically includes two parts of contents which are the application to be called and the operation to be performed. For example, the user sets the mobile phone to be in a mute mode and the call instruction which is sent includes two parts of contents, which are a mobile phone mode management program and selecting the mute model. For another example, the user selects to send a short message after compiling the short message and the call instruction includes two parts of contents, which are a program of calling a short message and storing and sending the short message and a recipient's number.

Storing the call instruction and performing counting includes the following steps. Firstly, the mobile phone respectively compares the application called by the call instruction and the operation to be performed with applications called by all call instructions stored in the mobile phone and the corresponding operations to be performed. If they are inconsistent, then there isn't an identical call instruction, and the call instruction is counted and stored. Otherwise, there is an identical call instruction and 1 is added to the counting value of the call instruction which is stored.

Step 102, the mobile phone compiles the call instruction and environmental factors acquired by the mobile phone into an operation record which is stored in an operation record list of the mobile phone.

Here, step 102 further is embodied as the following steps. The mobile phone determines whether or not the counting value of the call instruction which is stored exceeds a record threshold which is preset in the mobile phone, and if the counting value exceeds the record threshold, compiles the call instruction and the environmental factors into the operation record which is stored in the operation record list of the mobile phone. Otherwise, return to Step 101.

The environmental factors may be acquired by a Global Positioning System (GPS) module and a temperature and humidity sensor module etc., which are equipped on the mobile terminal, or the environmental factors may be acquired by interaction between an acquisition module loaded with IOT technology and a wireless gateway. A specific acquisition method which is used may be determined according to one or more modules selected and equipped on the mobile phone by the user.

In the above, the environmental factors may be acquired when the call instruction is stored each time, or may be acquired when it is determined that the counting value of the call instruction which is stored exceeds the record threshold.

In the above, the record threshold is a value which is preset according to actual applications.

The operation record list is a list formed by multiple operation records.

Step 103, the mobile phone determines whether or not the number of operation records stored in the operation record list is larger than a training threshold which is preset, and if the number is larger than the training threshold, Step 104 is executed, otherwise, return to Step 101.

Here, the training threshold is a value which is preset according to actual applications. If the number of the operation records is larger than the training threshold, the training of the operation model is started.

Step 104, the mobile phone trains the operation model by utilizing the operation record list and counts an error of the operation model.

Here, the operation model is a mathematical model preset in the mobile phone, taking the environmental factors as inputs of the operation model and taking the call instruction as an output of the operation model. During actual applications, the model may be established by utilizing a Back Propagation (BP) network technology in a neural network. The neural network, which is an information intelligent processing system established by a method for simulating cranial nerves to deliver' information, has characteristics of self-learning, self-organizing, self-adapting and nonlinear dynamic processing etc., and is especially applicable to processing a complex nonlinear process. The BP network is one of the most broadly applied and successful neural networks so far. Usually, the BP network includes an input layer, a hidden layer and an output layer. For a data model established by the BP network, only contents of the input layer and the output layer of the data model can be seen by the user, e,g, the input layer is a value abstracted by each of environmental factors and the output layer is a value abstracted by the call instruction.

Training the operation model by utilizing the operation record list means rectifies the operation model by utilizing the operation record list, which includes the following steps. The mobile phone calls the operation records stored in the operation record list one by one, uses the environment factors in the operation record as input information of the operation model, compares output information of the operation model with the call instruction in the operation record, if the output information and the call instruction are identical, continues to call a next operation record to perform comparison, if the output information and the call instruction are different, adds 1 to the error of the operation model and rectifies the operation model, and then calls the next operation record to perform comparison until all operation records in the operation record list are called, wherein the error refers to difference times of the output information of the operation model and the call instructions in the operation record.

For example, during actual applications, the data model, which is established by utilizing the BP network technology, may be trained by adjusting weight values between layers. More specifically, the training process of the data model consists of two processes which are forward propagation and BP of the error.

In the above, the forward propagation for training the data model includes the following steps. The mobile phone calls the operation records stored in the operation record list one by one, uses a value corresponding to each of environmental factors of the operation record as an input of the data model, and outputs a value after processing performed by the hidden layer. If the outputted value does not accord with a value corresponding to the call instruction in the operation record, then the BP stage of the error is started, and 1 is added to the error. If the outputted value is the same as the value corresponding to the call instruction in the operation record, the next operation record is called to perform comparison until all operation records in the operation record list are called. In the above, the BP of the error includes the following steps. The error between the output of the data model and the value corresponding to the call instruction in the operation record is inputted into the hidden layer with a specific form of the BP network data model, and the hidden layer sends the error back to the input layer. The weight value of each unit of the hidden layer is rectified. The regulating process of the weight values of each layer of the forward propagation and the BP is performed over and over again and the process for regulating the weight values continuously is the training process of the data model. The data model can be put into use after the error is smaller than a threshold which is preset. The BP of the error refers to rectification of the data model.

Step 105, the mobile phone determines whether or not the error of the operation model is lower than a use threshold. If the error is lower than the use threshold, the operation model is trained successfully, and Step 106 is performed. Otherwise, return to Step 104.

Here, the use threshold is a value which is preset according to actual applications. If the error is lower than the use threshold, the operation model is trained successfully. If the error is higher than the use threshold, the operation model needs to be trained continuously, Step 106, when the mobile phone is used by the user, the mobile phone inputs the environmental factors which are acquired into the operation model and obtains the call instruction outputted by the operation model.

Here, using the mobile phone by the user refers to any behaviour that may lighten the mobile phone screen, e.g. the mobile phone may be unlocked by the user, or the mobile phone is turned on by the user etc.

Said Step 106 may be embodied as: the mobile phone acquires the environmental factors in real time. When the mobile phone is used by the user, the mobile phone inputs the current environmental factors into the operation model and obtains the call instruction outputted by the operation model, Or, Step 106 may further be embodied as: the mobile phone acquires the environmental factors in real time and then inputs the current environmental factors into the operation model in real time and obtains the call instruction of the operation model. Step 107 is performed when the mobile phone is used by the user.

Step 107, the mobile phone compiles the call instruction into selection information to be displayed to the user and performs an operation according to selection of the user.

Step 107 further is embodied as: converting the call instruction into the selection information refers to compiling the operation to be completed in the call instruction into a piece of selection information which the user needs to select whether or not to execute. If the user selects "yes", then an application is called directly and the operation is completed; if the user selects "no", then the operation is terminated.

In addition, after it is determined that the error of the operation model is lower than the use threshold in Step 105 above, i.e. after the operation model is trained successfully, the mobile phone further deletes the operation records in the operation record list, and the deleting process mainly includes the following steps. The mobile phone performs storage time length determination for the operation records in the operation record list one by one periodically. If the storage time length of an operation record exceeds a deleting threshold, the operation record is deleted, otherwise, no operation is performed.

Here, the periodicity refers to a time set according to actual conditions, e.g. the time may be one year. The storage time length refers to a time of the record from the current date, which is calculated by utilizing the date in the operation record. The deleting threshold is a threshold value preset according to actual conditions.

It can be seen that, by applying the steps above, when the user is about to use the mobile phone, a predicted forthcoming operation of the user will be displayed by the mobile phone by utilizing the environmental factors and the operation model. The user only needs to simply perform selection to complete a series of identical operations which are repeated every day. In addition, the mobile phone can obtain the latest operation record of the user by deleting the operation records, so that the mobile phone can make more accurate prediction by utilizing the latest use habits of the user.

Figure 2:
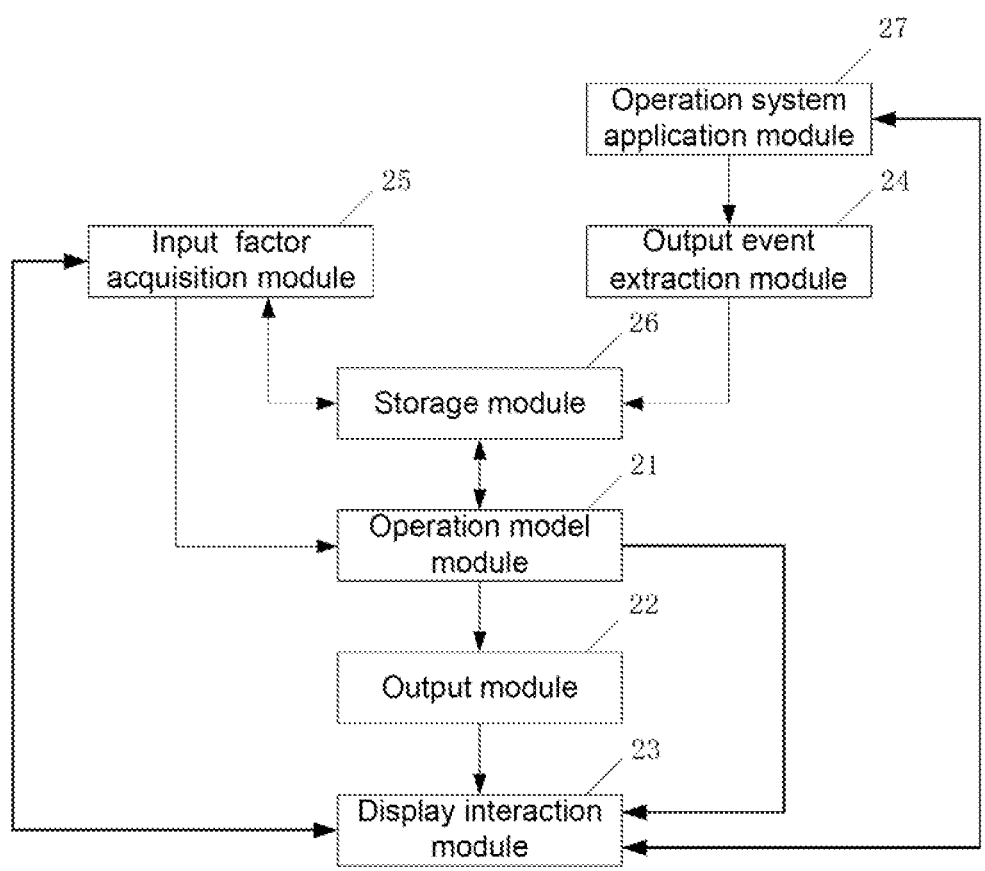
FIG. 2 is a structural diagram of a mobile terminal for predicting a user operation according to the disclosure.

To achieve the method for predicting the user operation above, a mobile terminal needs to be improved. Therefore, as shown in FIG. 2, the disclosure further provides a mobile terminal for predicting a user operation. The mobile terminal includes an operation model module 21, an output module 22 and a display interaction module 23. In the above, the operation model module 21 is configured to input environmental factors into an operation model to obtain an call instruction after the operation model is trained successfully, and send the call instruction to the output module 22;

the output module 22 is configured to receive the call instruction sent by the operation model module 21,convert the call instruction into selection information, and send the selection information to the display interaction module 23;

the display interaction module 23 is configured to receive the selection information sent by the output module 22 and display the selection information to a user.

the operation model module 21 is further configured to send notification of the successful training of the operation model to the display interaction module 23 after the operation model is trained successfully. Correspondingly, the display interaction module 23 is further configured to receive the notification of the successful training of the operation model from the operation model module 21 and then start to detect whether or not the mobile terminal is used by the user.

Said using the mobile phone refers to any behaviour that may lighten the mobile phone screen, e.g. the mobile phone may be unlocked by the user, or the mobile phone is turned on by the user etc.

The mobile terminal further includes an input factor acquisition module 25, configured to receive an environmental factor acquisition instruction sent by the display interaction module 23 and send environmental factor information which is acquired to the operation model module 21.

Correspondingly, the operation model module 21 is further configured to receive the environmental factor information sent by the input factor acquisition module 25. The display interaction module 23 is further configured to send the environmental factor acquisition instruction to the input factor acquisition module 25 when it is detected that the mobile terminal is used by the user, to trigger the input factor acquisition module 25 to acquire the environmental factors.

In the above, the input factor acquisition module 25 may perform the acquisition of the environmental factors after receiving the environmental factor acquisition instruction sent by the display interaction module 23 or perform the acquisition of the environmental factors in real time.

Here, the environmental factor information refers to information consisting of environmental factors including a date, a time, a location, a height, a temperature and a humidity etc.

The input factor acquisition module 25 is specifically configured to acquire the environmental factors by a GPS module, and a temperature and humidity sensor module etc., or acquire the environmental factors by interaction between an acquisition module loaded with IOT technology and a wireless gateway.

The mobile terminal further includes an output event abstraction module 24 and a storage module 26.

The output event abstraction module 24 is configured to determine whether or not a counting value of the call instruction exceeds a record threshold, and if the counting value exceeds the record threshold, send the call instruction to the storage module 26, otherwise, perform no operation.

Correspondingly, the storage module 26 is configured to receive the call instruction sent by the output event abstraction module 24.

The output event abstraction module 24 is specifically configured to compare an application called by the call instruction and an operation to be performed with applications called by all call instructions which are stored and corresponding operations to be performed. If there isn't an identical call instruction, the call instruction is counted and stored, otherwise, 1 is added to the counting value of the call instructions which is stored.

The storage module 26 is further configured to obtain the environmental factor information from the input factor acquisition module 25 when receiving the call instruction, compile the call instruction and the environmental factors as an operation record, and fill the operation record in an operation record list. Correspondingly, the input factor acquisition module 25 is further configured to provide the environmental factor information for the storage module 26.

In the above, the input factor acquisition module 25 may perform the acquisition of the environmental factors after receiving an environmental factor information request from the storage module 26, or perform the acquisition of the environmental factors in real time.

The storage module 26 is further configured to count the number of operation records stored in the operation record list, determine whether or not the number of the operation records stored in the operation record list is larger than a threshold which is preset, if the number is larger than the threshold, send the operation record list to the operation model module 21, otherwise, perform no operation. Correspondingly the operation model module 21 is further configured to receive and store the operation record list sent by the storage module 26, and is specifically configured to call the operation records in the operation record list one by one, use the environment factors in the operation record as input information of the operation model, compare output information of the operation model with the call instruction in the operation record, if the output information and the call instruction are identical, continue to call a next operation record to perform comparison, and if the two are different, add 1 to an error of the operation model and rectifies the operation model, and then call the next operation record to perform comparison until all operation records in the operation record list are called, and then determine whether the error of the operation model is lower than a use threshold which is preset. If the error is lower than the use threshold, the training of the operation model is successful, and otherwise, the training of the operation model fails and the operation model is trained over again.

In the above, the operation model is a mathematical model preset in the operation model module 21. The inputs of the operation model are the environmental factors and the output of the operation model is the call instruction. During actual applications, the operation model may be established by utilizing a BP network technology in a neural network.

The operation model module 21 may be a data model established by utilizing the BP network technology and the data model is trained by adjusting weight values between layers. A process for training the data model by the operation model module 21 includes the following steps. The operation records stored in the operation record list are called one by one, values corresponding to environmental factors of the operation record are used as inputs of the data model, and output a value after processing performed by a hidden layer. If the outputted value does not accord with a value corresponding to the call instruction in the operation record, then a BP stage of the error is started, and 1 is added to the error. If the outputted value is the same as the value corresponding to the call instruction in the operation record, a next operation record is called to perform comparison until all operation records in the operation record list are called, wherein the BP of the error includes the following step. The error between the output of the data model and the value corresponding to the call instruction in the operation record is inputted into the hidden layer with a specific form of the BP network data model, and the hidden layer sends the error back to the input layer. The weight value of each unit of the hidden layer is rectified. The regulating process of the weight values of each layer of the forward propagation and the BP is performed over and over again and the process for regulating the weight values continuously is the training process of the data model. The data model can be put into use after the error is smaller than a threshold which is preset. The BP of the error refers to rectification of the data model.

The operation model module 21 is further configured to notify the storage module 26 that the operation model is trained successfully after the operation model is trained successfully. Correspondingly, the storage module 26 is configured to receive the notification of the successful training of the operation model from the operation model module 21, and perform storage time length determination for the operation records in the operation record list one by one periodically. If the storage time length of an operation record exceeds a deleting threshold, the operation record is deleted, otherwise, no operation is performed.

In the above, the periodicity refers to a time set according to actual conditions, e.g. the time may be one year. The storage time length refers to a time of the record from the current date, which is calculated by utilizing the date in the operation record. The deleting threshold is a threshold preset according to actual conditions.

The mobile terminal further includes an operation system application module 27.

The operation system application module 27 is configured to send the call instruction which is received to the output event abstraction module 24. Correspondingly, the output event abstraction module 24 is further configured to store the call instruction sent by the operation system application module 27.

The operation system application module 27 is further configured to receive the call instruction sent by the display interaction module 23 and send a called application and a response of the application to the display interaction module 23. Correspondingly, the display interaction module 23 is further configured to display an interface for the user, and convert the user's calling of the application into the call instruction to be sent to the operation system application module 27, and then display an application response to the user, wherein the application response is sent by the operation system application module 27.

It can be seen that, by applying the solution above, operation habits of the user can be memorized by utilizing the operation model, so that a forthcoming operation of the user can be predicted and the mobile terminal is more intelligent.

The technical solution disclosed by the disclosure may be applied to an IOT environment or a non-IOT environment, and the specific implementation is described in details below.

Figure 3:
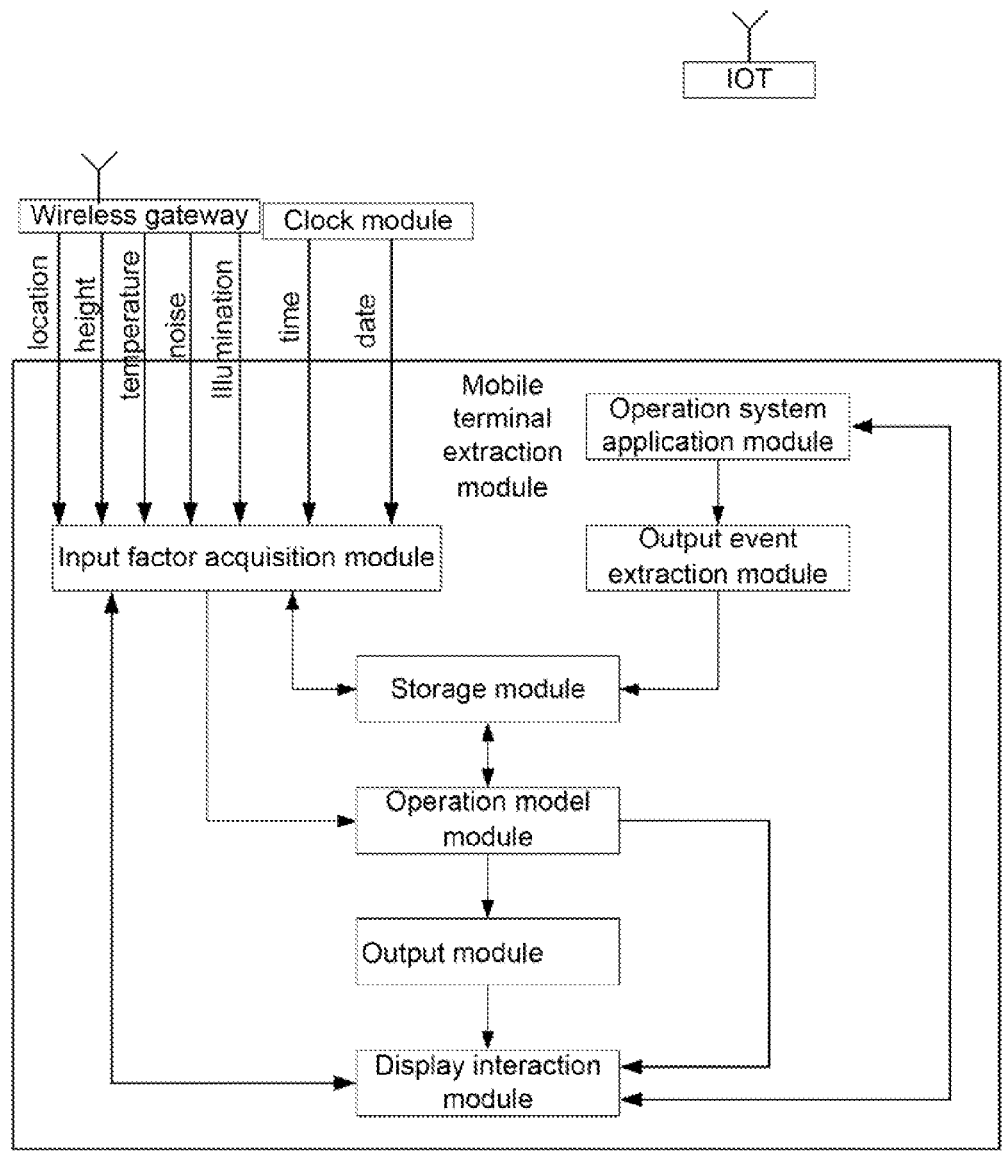
FIG. 3 is a structural diagram of a mobile terminal for predicting a user operation in an Internet of Things (IOT) environment according to the disclosure.

FIG. 3 is a structural diagram of a mobile terminal for predicting a user operation in an IOT environment according to the disclosure. It can be seen that an input factor acquisition module is added to the mobile terminal. Such environmental factors as a location, a height, a temperature, noise and illumination can be obtained from IOT through interaction between an external wireless gateway and the input factor acquisition module. A time and a date may be obtained through interaction between an external clock module and the input factor acquisition module. Therefore, the input factor acquisition module is able to obtain environmental factor information to complete an implementation process as described in the disclosure.

Figure 4:
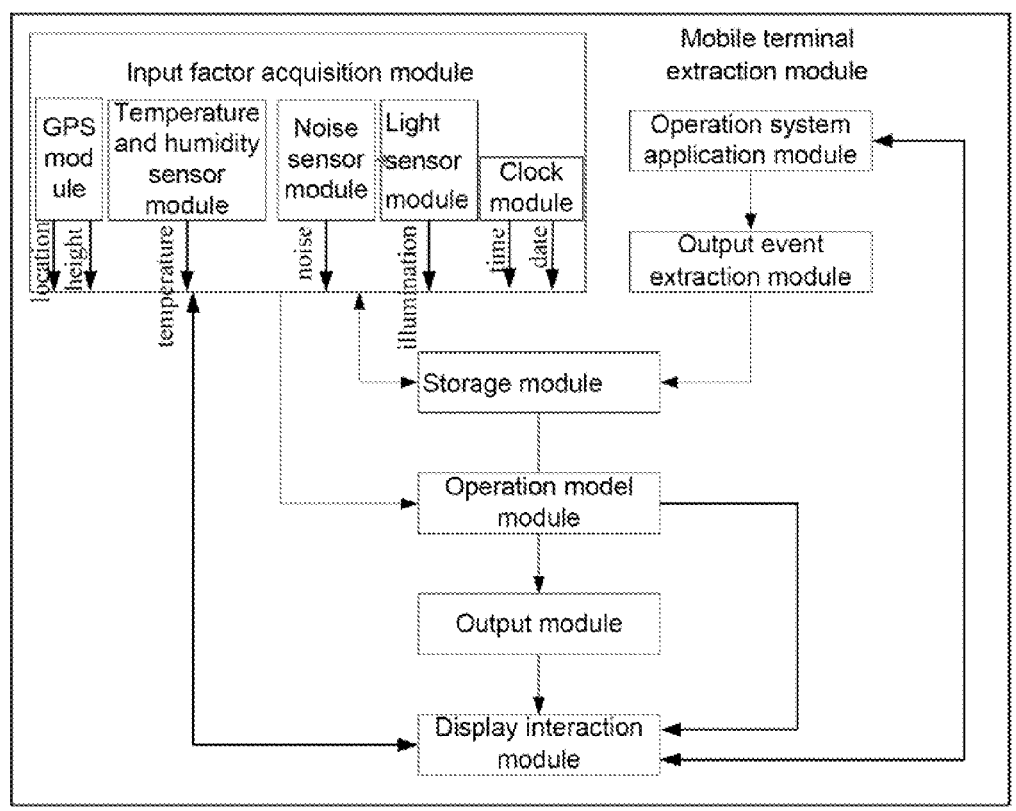
FIG. 4 is a structural diagram of a mobile terminal for predicting a user operation in a non-IOT environment according to the disclosure.

FIG. 4 is a structural diagram of a mobile terminal for predicting a user operation in a non-IOT environment according to the disclosure. It can be seen that an input factor acquisition module is added to a mobile terminal. The input factor acquisition module may be a GPS module, a temperature and humidity sensor module, a noise sensor module, a light sensor module or a clock module specifically, or a random combination of the modules above. Such environmental factors as a location, a height, a temperature, noise, illumination, a time or a date may he obtained by these input factor acquisition modules and the implementation process as described in the disclosure may be completed by utilizing these environmental factors.

The above are only preferred embodiments of the disclosure and should not be used for limiting the protection scope of the disclosure.

What is claimed is:
1. A method for predicting a user operation, comprising:
after training an operation model successfully, a mobile terminal obtaining a call instruction by utilizing acquired environmental factors and the operation model, and at last converting the call instruction into selection information to be displayed to a user;
wherein training the operation model successfully is embodied as counting the error of the operation model, determining whether or not the error of the operation model is lower than a use threshold which is preset, if the error is lower than the use threshold, the training of the operation model is successful;
wherein after training the operation model successfully, the mobile terminal periodically performing storage time length determination for the operation records in the operation record list one by one, if the storage time length of an operation record exceeds a deleting threshold, then the operation record is deleted;

wherein training the operation model is embodied as adjusting the operation model by an operation record list;

wherein adjusting the operation model by the operation record list comprises: the mobile terminal calling operation records in the operation record list one by one, using the environment factors of the operation records as input information of the operation model, comparing output information of the operation model with the call instruction in the operation record, if the output information and the call instruction are identical, continuing to call a next operation record to perform comparison, and if the output information and the call instruction are different, adding 1 to an error of the operation model and adjusting the operation model, and then calling the next operation record to perform comparison until all operation records in the operation record list are called.

2. The method according to claim 1, wherein if the error is not lower than the use threshold, the training of the operation model fails and training the operation model over again.

3. The method according to claim 1, wherein before training the operation model by the mobile terminal, the method further comprises the mobile terminal storing the call instruction and performing counting, when a counting value of the call instruction is higher than a record threshold which is preset, compiling the call instruction and the environmental factors as an operation record and storing the operation record in the operation record list.

4. The method according claim 1, wherein converting the call instruction into the selection information to be displayed to the user comprises compiling a to-be-completed operation in the call instruction into a piece of selection information which needs the user to select whether or not to execute.

5. A mobile terminal, comprising a hardware processor configured to execute following modules:

an operation model module, configured to input environmental factors into an operation model after the operation model is trained successfully, and send a call instruction to an output module, wherein the call instruction is calculated and outputted by the operation model;

an output module, configured to receive the call instruction sent by the operation model module, convert the call instruction into selection information, and send the selection information to a display interaction module; and the display interaction module, configured to receive the selection information sent by the output module and display the selection information to a user;

wherein the operation model module is specifically configured to call operation records in the operation record list one by one, use the environment factors of the operation records as input information of the operation model, compare output information of the operation model with the call instruction in the operation record, if the output information and the call instruction are identical, continue to call a next operation record to perform comparison, and if the output information and the call instruction are different, add 1 to an error of the operation model and adjust the operation model, and then call the next operation record until all operation records in the operation record list are called;

wherein the operation model module is further configured to determine whether or not the error of the operation model is lower than a use threshold which is preset, if the error is lower than the use threshold, the training of the operation model is successful;

wherein the operation model module is further configured to periodically perform storage time length determination for the operation records in the operation record list one by one after training the operation model successfully, if the storage time length of an operation record exceeds a deleting threshold, then the operation record is deleted.

6. The mobile terminal according to claim 5, wherein:
the mobile terminal further comprises an input factor acquisition module, configured to receive an environmental factor acquisition instruction sent by the display interaction module and send environmental factor information to the operation model module;

correspondingly, the operation model module is further configured to receive the environmental factor information sent by the input factor acquisition module; and the display interaction module is further configured to send the environmental factor acquisition instruction to the input factor acquisition module when it is detected that the terminal is used by the user.

7. The mobile terminal according to claim 5, further comprising: an output event abstraction module and a storage module, wherein the output event abstraction module is configured to determine whether or not a counting value of the call instruction exceeds a record threshold, and if the counting value exceeds the record threshold, send the call instruction to the storage module, otherwise, perform no operation; and the storage module is configured to receive the call instruction sent by the output event abstraction module.

8. The mobile terminal according to claim 7, wherein:
the mobile terminal further comprises: an operation system application module, configured to send the call instruction to the output event abstraction module; and correspondingly, the output event abstraction module is further configured to store the call instruction sent by the operation system application module.

9. The mobile terminal according to claim 7, wherein the storage module is further configured to obtain the environmental factor information from the input factor acquisition module when receiving the call instruction, compile the call instruction and the environmental factors as an operation record, and fill the operation record in the operation record list; and correspondingly, the input factor acquisition module is further configured to provide the environmental factor information to the storage module.

10. The mobile terminal according to claim 5, wherein if the error is not lower than the use threshold, the operation model is trained over again.

11. The method according to claim 2, wherein converting the call instruction into the selection information to be displayed to the user comprises compiling a to-be-completed operation in the call instruction into a piece of selection information which needs the user to select whether or not to execute.

* * * * *